June 20, 1939.   L. B. PREBLE   2,163,450
HEATED STEERING WHEEL
Filed Feb. 12, 1938
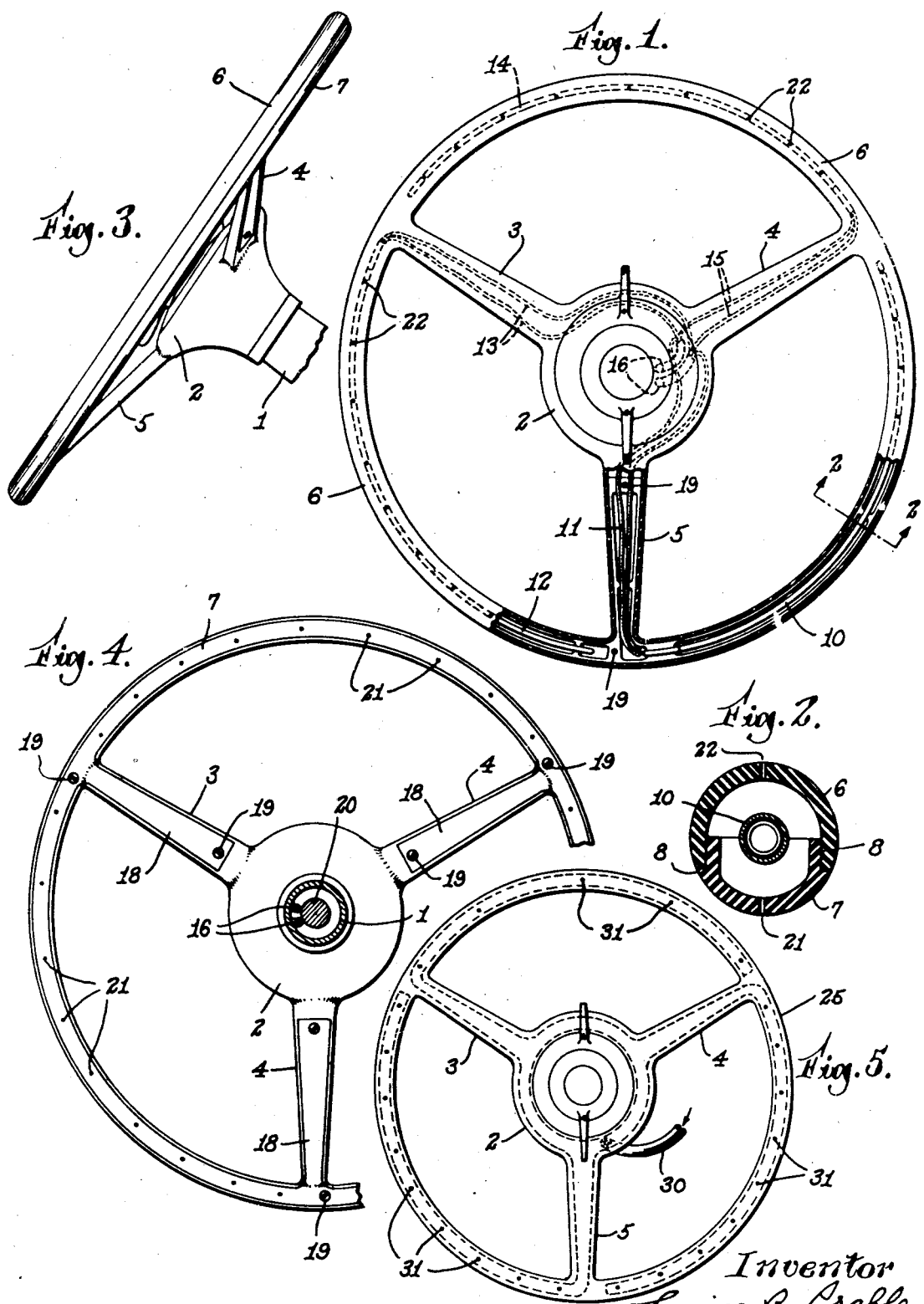
Inventor
Louise B. Preble
by James R. Hodder
Attorney Patented June 20, 1939

2,163,450

UNITED STATES PATENT OFFICE 2,163,450

HEATED STEERING WHEEL

Louise B. Preble, Hingham, Mass.

Application February 12, 1938, Serial No. 190,239

1 Claim. (Cl. 219—19)

My present invention is a novel and improved steering wheel, having heating means incorporated and constructed therein to facilitate the use of the same in cold weather.

My invention is particularly directed to the construction of a steering wheel, and heating elements therefor, for use with automobiles, trucks, aeroplanes, motor boats, ships, or the like, and enables the operator to keep his hands from becoming numb in cold weather, and having the advantage of being able to hold such a wheel without gloves or with extremely thin gloves, facilitating the grip and safety operation thereof, as well as insuring comfort to the driver.

Various attempts to utilize heating devices for automobile steering wheels have heretofore been made, such for example as wrapping or securing heating wires or devices to the outside of the normal or standard type of steering wheel, but all such prior devices have been objectionable, being bulky, uneven in heat distribution, subject to wear, breakage, and damage to the user and otherwise unsatisfactory in use.

My present invention obviates the difficulties above briefly outlined and provides a steering wheel construction with the heating instrumentalities entirely protected and concealed within the structure of the hand-holding portion of the steering wheel, being incorporated directly therein and protected from damage and concealed from view.

In carrying out my present invention I utilize any suitable source of heat, such for example as an electric unit, or units, of heated currents of air forced under the influence of a fan from any suitable source of heat, such as a heating radiator within the vehicle, conducting the same to the interior of the hand-holding portion or rim of the wheel, as well also as the spokes, if desired, since the operator frequently holds the spokes, and thus effecting a constant, even, uniform flow of heat around the steering wheel.

Various ways of carrying out my invention may be employed, two such methods being herein illustrated. Preferably, I utilize a plurality of electric heating units shaped to fit around the periphery of the wheel and arranged to be concealed and protected within the circumference of the hand-holding rim, as well also as, preferably, having such units installed so as to permit ready assembly and renewal of the heating units and conducting wires when desired.

I may, and preferably will, make the steering wheel with a removable section, or sections, to which the heating units may be attached and so arranged as to position the heating unit substantially central of the hand-holding rim or portion to be heated so as to afford an even diffusion of heat when desired. Small recesses may also be formed at predetermined portions in the rim to permit a flow of heated air therein, around the heating unit and therefrom, if desired.

Where heated air is forced thru a suitable conduit into the interior of the hollow steering wheel, I also prefer to form a plurality of small openings permitting the forcing out of the normally cold air contained within the center of the rim and the inflow of the heated air therein and therefrom.

In the use of an electrical heating unit, or units, I may provide a rheostat to give varying degrees of heat and incorporate same as a switch either on the instrument or panel board of the vehicle or directly adjacent the rim on the steering wheel. When heated air is employed, a switch to initiate the forced draft may also be conveniently located either on the instrument, panel board, or elsewhere, as desired, and varying speeds of the draft-creating means can be provided if desired.

Referring to the drawing illustrating preferred embodiments of my present invention, Fig. 1 is a plan view of the steering wheel, partly broken away to show the electric units and conducting wires therein;

Fig. 2 is an enlarged cross-sectional view on the line 2—2 of Fig. 1;

Fig. 3 is a side view;

Fig. 4 is a bottom plan view of the steering wheel of Figs. 1 and 3, and

Fig. 5 is a diagrammatic view of an air-feeding installation.

As shown in the drawing, 1 indicates a typical steering post as installed in air or land vehicles, or motor boats, to which a hub 2 is fitted and over which a plurality of spokes, here shown as three in number, and designated as 3, 4, and 5, extend to the hand-holding rim or steering wheel 6. This wheel, embodying my invention of an interior heating element, as herein illustrated, is made in two sections, the upper or top section 6 and a lower or removable section 7, having an interlocking dovetailed connection as indicated at 8, Figs. 1 and 2.

Such steering wheels are usually now made of non-metallic material although hollow metal was formerly utilized for the rim and spokes and can, of course, be employed with my invention if desired. But I have herein illustrated the same as of the present usual type of material such as Bakelite, Catalin, or other plastic or moldable synthetic material. The lower portion 7 is preferably made removable and to the same may be attached electric heating elements 10, 12, and 14 removable with the section 7 and capable of removal therewith.

As herein shown, I employ three such electrical heating units 10 around the periphery of the rim 6, between the several spokes 3, 4, and 5 although, if desired, a plurality can be utilized. Pairs of current conducting wires, as indicated at 11, 13, and 15 respectively, lead from the main wires 16, which wires 16 extend downwardly inside the post 1 to any suitable source of power such as the battery of the vehicle.

Preferably, and as herein shown, I have illustrated the entire removable part of the rim 7 with spoke-extending portions 18—18, attaching the same by a plurality of screws, or the like, 19—19 at various points, permitting either the attachment of the section 7 carrying the heating elements to the upper portion 6 and permitting ready removal of the same. Suitable length or slack is provided around the interior of the hub 2 and between the post 1 and the steering column 20 to allow the partial rotation of the steering wheel in either direction without dislodging the current conducting wires.

I may provide a plurality of air inlets as shown at 21 to the interior of the rim between the sections 6 and 7 where the air is warmed by the heating elements 10, 12, and 14; and I provide corresponding outlets 22—22 in the top of the rim 6 to permit a flow of warm air therethru directly to the hands of the operator, these openings facilitating warming the operator's hands.

As shown in Fig. 5, a hollow rim 25 either in sectional form or as a continuous tubular rim is provided, with openings thereto from the hollow spokes 3, 4, and 5 permitting heated air currents to circulate therearound, being led into a circular conduit within the hollow hub 2 by a conduit 30 leading to any suitable source of heat and a blower or forced draft instrumentality. Such a conduit 30 may be a flexible tube around the steering post with sufficient length and slack to permit the rotation of the wheel, and in this form I provide openings 31 thru the top of the rim 25 in which to permit the escape of cold air therein when the heat is turned on to be forced thru the conduit 30, permitting the warm air to flow therein and also outwardly direct to the hands of the operator 31.

It will thus be seen that in both forms herein shown for illustrative purposes, I have devised a construction of steering wheel suitable for any use to which such an article may be put, having internal heating means. Such internal heating devices may be an electric heating unit, or a plurality of units, or a current of heated air and means to supply heating wires or such current from a suitable source of power.

I claim:

A heated steering wheel of the kind described, formed in two sections, the top section comprising a hand-holding rim with a circumferential channel rigidly united to the hub of the wheel by a plurality of channel-like spokes, and a lower covering section for both rim and spoke channel sections, in combination with a plurality of electrical heating units removably secured in the said rim channel, together with current-conducting wires enclosed in the channels of said spokes.

LOUISE B. PREBLE.